(12) United States Patent
Yasman et al.

(10) Patent No.: US 10,915,258 B2
(45) Date of Patent: Feb. 9, 2021

(54) BI-DIRECTIONAL NEGOTIATION FOR DYNAMIC DATA CHUNKING

(71) Applicant: Intel Corporation, Santa Clara, CA (US)

(72) Inventors: Eugene Yasman, Pardes Hanna (IL); Liron Ain-Kedem, Kiryat Tivon (IL); Nir Gerber, Haifa (IL)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 15/857,158

(22) Filed: Dec. 28, 2017

(65) Prior Publication Data

US 2019/0042123 A1 Feb. 7, 2019

(51) Int. Cl.
*G06F 3/06* (2006.01)
*H04L 12/70* (2013.01)

(52) U.S. Cl.
CPC .......... *G06F 3/0631* (2013.01); *G06F 3/0604* (2013.01); *G06F 3/0611* (2013.01); *G06F 3/0644* (2013.01); *G06F 3/0656* (2013.01); *G06F 3/0673* (2013.01); *H04L 47/00* (2013.01)

(58) Field of Classification Search
None
See application file for complete search history.

(56) References Cited

U.S. PATENT DOCUMENTS

| | | | | |
|---|---|---|---|---|
| 5,339,413 A | * | 8/1994 | Koval | G06F 13/387 709/231 |
| 5,764,927 A | * | 6/1998 | Murphy | G05B 19/0423 710/105 |
| 2002/0099758 A1 | * | 7/2002 | Miller | G06F 9/544 718/104 |
| 2005/0080874 A1 | * | 4/2005 | Fujiwara | G06F 3/0617 709/217 |

* cited by examiner

*Primary Examiner* — Gary W. Cygiel
(74) *Attorney, Agent, or Firm* — Schwegman Lundberg & Woessner, P.A.

(57) ABSTRACT

Systems and techniques for bi-directional negotiation for dynamic data chunking are described herein. A set of available features for a memory subsystem. The set of available features including latency of buffer locations of the memory subsystem. An indication of a first latency requirement of a first data consumer and a second latency requirement of a second data consumer may be obtained. A first buffer location of the memory subsystem for a data stream based on the first latency requirement may be negotiated with the first data consumer. A second buffer location of the memory subsystem for the data stream based on the second latency requirement may be negotiated with the second data consumer. An indication of the first buffer location may be provided to the first data consumer and an indication of the second buffer location may be provided to the second data consumer.

23 Claims, 10 Drawing Sheets

BI-DIRECTIONAL NEGOTIATION FOR DYNAMIC DATA CHUNKING

TECHNICAL FIELD

Embodiments described herein generally relate to computer memory management and, in some embodiments, more specifically to bi-directional negotiation for dynamic data chunking for a memory subsystem.

BACKGROUND

A computing system may include a data producer (e.g., image sensor, etc.) and one or more data consumers (e.g., image processor, etc.). Data may be placed in memory buffers by the data producer for consumption by a data consumer. The computing system may include a variety of memory components having different features (e.g., capacity, latency, compression capabilities, etc.). Data consumers may have different memory feature requirements.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
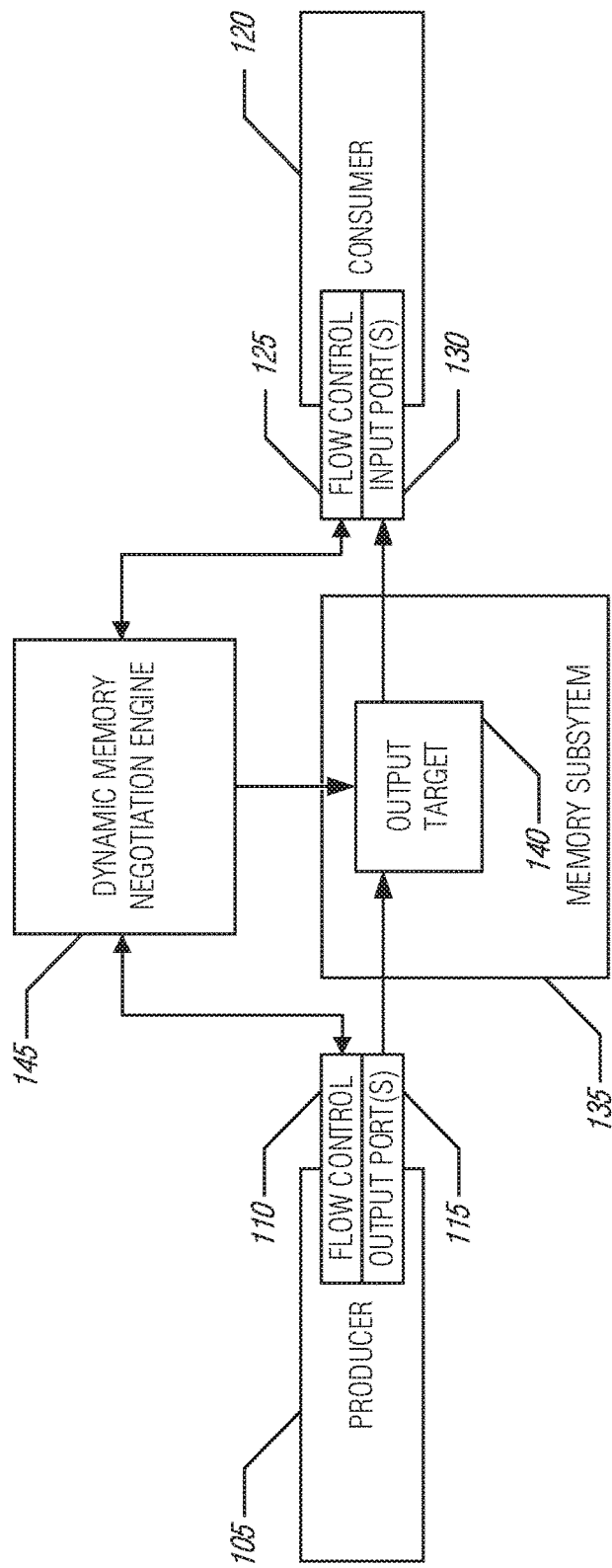
FIG. 1 is a block diagram of an example of an environment and system for bi-directional negotiation for dynamic data chunking, according to an embodiment.

System memory (e.g. dynamic random-access memory (DRAM), etc.) bandwidth may pose a problem in modern systems on chips (SoCs) due to power requirements. In addition, system memory bandwidth may limit performance of the SoC and may increase production costs. To address these issues with system memory bandwidth, the system memory bandwidth may be optimized for single and multi-destination data (e.g., media, etc.) producers under dynamically changing conditions and constraints. Traditional system memory optimization techniques may be divided into two main categories: (1) frame buffer compression and (2) direct streaming using dedicated or internal on-chip memories.

Traditional buffer compression may impose requirements of bigger data chunks and bigger latency bounds. Compression may also be dependent on a data consumer use case and an ability of the consumer to decompress the data. In specific cases, there may be a need to work in streaming via system memory and to optimize the bandwidth using compression. Some traditional systems may use fixed smaller data chunk granularity. Fixed smaller data chunk granularity may enable low-latency. However, it may not allow compression and therefore system memory bandwidth may not be optimized.

Traditional direct streaming overcome latency and power limitations. Direct streaming may utilize smaller data chunks required to fit into cyclic internal memory and may be consumed in smaller fixed latency bounds. However, these traditional techniques may be incompatible with many frame-buffer compression techniques that may require bigger data chunks and cannot fit into such internal memories or cannot be consumed in similar tight latency bounds.

Traditional direct streaming via internal or dedicated memories may potentially preserve more system memory bandwidth compared to traditional frame buffer compression approaches. However, traditional direct streaming may not be universally applied between certain data producers and data consumers such as, for example, under some dynamic conditions caused by a dynamic or on-demand change in use-case in one or more of the data producer, the data consumer, and the memory control logic. A limitation in traditional direct streaming connections may arise from the data chunk granularity being fixed by the parties (e.g., producer, consumer, controller, etc.) throughout the session.

Traditional system memory bandwidth optimization techniques may not dynamically and efficiently move data between full-frame and compressed frame streaming and sub-frame-latency streaming. The traditional approached to system memory bandwidth optimization may also fail to dynamically and efficiently move between single and multi-destination streaming where every destination may have different data chunk and latency requirements. In some instances, traditional techniques may not be able to enable low-latency streaming due to differences in full-frame streaming granularity requirements.

In an example, streaming via a smaller cyclic buffer in internal memory may enable low-power (e.g., suppressed power versus traditional memory circuitry having similar capacity, maintained power consumption at increased capacity levels, etc.) and low-latency (e.g., reduced latency over traditional memory circuitry, etc.) for a single workload fully utilizing an image signal processor (ISP) pipeline. However, in particular dynamic cases where multiple simultaneous workloads time-multiplex a single ISP pipeline, originally fixed low-latency operation may not be possible using traditional techniques. In such cases, dynamic change of the streaming granularity into a full-frame buffer with optional compression may introduce important bandwidth and power optimizations.

In another example, streaming via smaller cyclic buffer in internal/dedicated memory may enable low-power and low-latency. However, in particular dynamic cases there may be a requirement to operate in bigger data chunks for common multi-destination consumption of the data being shared (i.e. written only once). This operation may be ineffective or may not be possible with traditional fixed data chunk approaches.

In yet another example, streaming via a smaller cyclic buffer in internal/dedicated memory may enable low-power and low-latency. However, in particular dynamic cases there may be a requirement to keep track of the full frame representation for intermediate access. This may be required when one of the existing or new consumers require intermediate processing, filtering, rotation, reference, temporal nose reduction (TNR), bi-directional frame (B-frame), different walk-order, etc.

In yet another example, streaming from a camera to a video encoder may use low-power low-latency streaming for P-frames and may dynamically switch into full-frame data chunk reporting for B-frames with optional compression. Traditional solutions may utilize fixed data chunks when streaming via internal or external memories. Such fixed data chunks may be sized for the lowest or best case latency. Traditional latency adaptive solutions with dynamic back-pressure mitigation techniques may be based on thresholds that may be used to reactively move between pre-defined latency bounds and memory types, but may preserve a fixed data chunk definition.

Fixed data chunk approaches may impact the ability to dynamically adapt for changing conditions on existing and newly added data consumers. Existing solutions may limit flexibility of dynamic control and may make trade-offs between latency, power, bandwidth, and quality. A disadvantage of the traditional reactive approach may be that fixed data chunks are defined by the smallest pre-defined latency bound and, thus, may not allow dynamic change in data chunk or data chunk reporting definition for existing or newly added data consumer. For example, the data consumers may apply different data consuming patterns or it may be optimal to dynamically move into streaming using common frame-based granularity for reference, intermediate, or compressed frames.

The techniques disclosed herein may overcome problems with traditional system memory bandwidth optimization techniques by optimizing bandwidth on a per-use-case basis with adaptive control of the data destination, chunking, and compression using dynamic bi-directional negotiation between data producers and data consumers. The present techniques may enable dynamic trade-off for bandwidth, latency, memory footprint, and quality by streaming to multiple destinations where the same data stream may be sent to the same shared buffer or distinct dedicated buffers.

Dynamic destination streaming may allow selection of a buffer size and memory type and location appropriate for various data consumers (e.g., one data consumer, a group of data consumers, etc.). Dynamic data chunk definition may allow scaling of the latency bound and data format (e.g., packing, compression, etc.). Dynamic destination streaming and dynamic data chunk definition may allow data to be optimally streamed to a variety of data consumers having different (or similar) consumption requirements simultaneously resulting in full memory bandwidth optimization across consumers.

Dynamic scaling of bandwidth, latency, memory footprint, and quality and streaming to multiple destinations may output the same data stream to a shared buffer with a same (or distinct) chunk granularity for multiple consumers and may split the data stream to distinct dedicated buffers having different granularities. System memory bandwidth may be optimized in dynamic single and multi-consumer streaming cases by adapting the data chunk granularity and format and selecting between dedicated or shared buffering in a component of a memory subsystem that is appropriate for the data chunk granularity and format. In an example, data may be moved between direct low-power streaming via internal dedicated memory and frame based streaming with optional compression and on-demand data sharing.

Scaling the data chunk definition and destination using dynamic bi-directional negotiation between the data producer and data consumers enables dynamic optimizations per use-case where data can be directed to the system or to the internal memory. A data buffer may be dynamically dedicated per consumer or may be shared between multiple consumers by selecting the data destination and adapting data chunk definitions. Adaptation of the data chunk granularity allows a memory manger to meet the system constraints with optimized efficiency. The scaling capability may be supported by the producer, consumers, or both. One or both the producer or consumer may work with the memory manager to negotiate the buffer locations and the dynamic data chunk granularity. For example, the consumers may provide an indication of requirements for data consumption and the producer may provide an indication of requirements. The capabilities of the memory subsystem may be evaluated and the consumer and the negotiation may include an alternating transmission of requirements and capabilities until a mutually acceptable buffer location is identified for the data. For example, a consumer may indicate requirements for consuming data at a peak consumption level and the producer may be able to provide data to a buffer location of the memory subsystem at a higher latency level, but may provide an indication of an ability to provide data with an optimization technique. The consumer may return and indication that data may be consumed using the optimization technique at the provided latency level and a buffer location may be established in a memory location of the memory subsystem supporting the latency level and the optimization technique. This type of negotiation may be conducted between the producer, the consumers, and the memory subsystem to provide appropriate buffer locations for each consumer. This multiple destination transmission capability provides the ability for a data producer to output data at different granularity and to direct streams to different memory (e.g. system, dedicated on-chip memory, etc.) destinations with optional compression enabled or disabled through dynamic negotiation between the producer and consumer.

Data streams by be dynamically moved between custom latency, sub-frame latency, and full-frame latency with control over the data chunk definition and the amount of data chunk indications. Operating in sub-frame streaming may allow for low-latency while dynamic use cases may be allowed by moving streams into custom and full-frame streaming on-demand.

Dynamic scaling of data chunk definition may allow dynamic control over the quantity of data produce and consume indications and messages transmitted on the memory subsystem. In some cases, actual data chunk definition may remain fixed while data produce and consume indications may be filtered or skipped by the streaming flow control to increase reporting granularity and reduce amount of messaging.

In an example, a producer may have multiple output ports with per-port flow control capabilities. Any port may be dynamically enabled and disabled (e.g., multi-rate, etc.) and may dynamically adapt its data chunk and/or reporting chunk definition. Depending on the number of concurrent consumers and their capabilities, the multi-destination producer may dynamically adapt the number of active data ports, data indications, and may share or dedicate its output data between consumers. The present techniques may reduce or balance data indication overheads. Alternatively or additionally, data indications may be adapted per dynamic buffer allocation or size. In an example, the same physical consumer may consume the same data single or multiple times in the same or different granularity. When accessing the same data multiple times the same physical consumer may apply different time-sharing and time-multiplexing schemes and may trade or balance the latency differently (e.g., time-sharing of the same physical component or chain-of-components, ISP blocks or pipeline entities, etc.). Such balancing schemes may allow interleaving in either equal sub-fragment granularities or in non-equal granularities to allow for latency control and prioritization (e.g. sub-fragment versus full-frame, single cam video or preview versus stills or multi-cam video, etc.).

In another example, different consumers may consume the same data in same or different granularities, at the same or different time. The present subject matter may allow a data producer to dynamically move between custom or sub-frame and full-frame latency streaming. Various dynamic buffering options and optimizations may be allowed based on the negotiations between the producer and consumers. For example, features such as data packing, compression, data sharing, etc. may be negotiated between the producer and the consumers to generate optimal memory buffers in the appropriate locations with appropriately enabled features. For example, data sharing may allow the same data to be written only once at the commonly supported layout and granularity for a plurality of consumers. In some cases, this capability may enable dynamic single or multiple consumer(s) or dynamic single or multiple instances of the same consumer(s) time-sharing to consume data from a common buffer with features enabled to provide optimal memory bandwidth.

FIG. 1 is a block diagram of an example of an environment 100 and system 145 for bi-directional negotiation for dynamic data chunking, according to an embodiment. The environment 100 may include a data producer 105 (e.g., image sensors, image signal processors, display engines, etc.). The data producer 105 may be communicatively coupled (e.g., via shared bus, etc.) to producer flow control logic 110 and output ports) 115. The producer 105 may produce data for consumption by the consumer 120 via an output target 140 (e.g., memory buffer, etc.) of a memory subsystem 135. The consumer 120 may be communicatively coupled to consumer flow control logic 125 and input port(s) 130.

The system 145 may be a dynamic memory negotiation engine. The system 145 may operate between the producer flow control logic 110 and the consumer flow control logic 125 to negotiate the output target 140 and its respective features. For example, the system 145 may negotiate a location of the memory subsystem 135 to locate the output target 140 based on a maximum latency value negotiated between the producer 105 and the consumer 120. For example, the output target may be generated in a low-power memory component of a system on chip (SoC) subsystem of a computing device capable of sub-frame latency. Additional features such as compression, packing, data sharing, data chunk size, etc. may be negotiated between the producer 105 and consumer 120 by the system 145 to optimize memory bandwidth.

Figure 2:
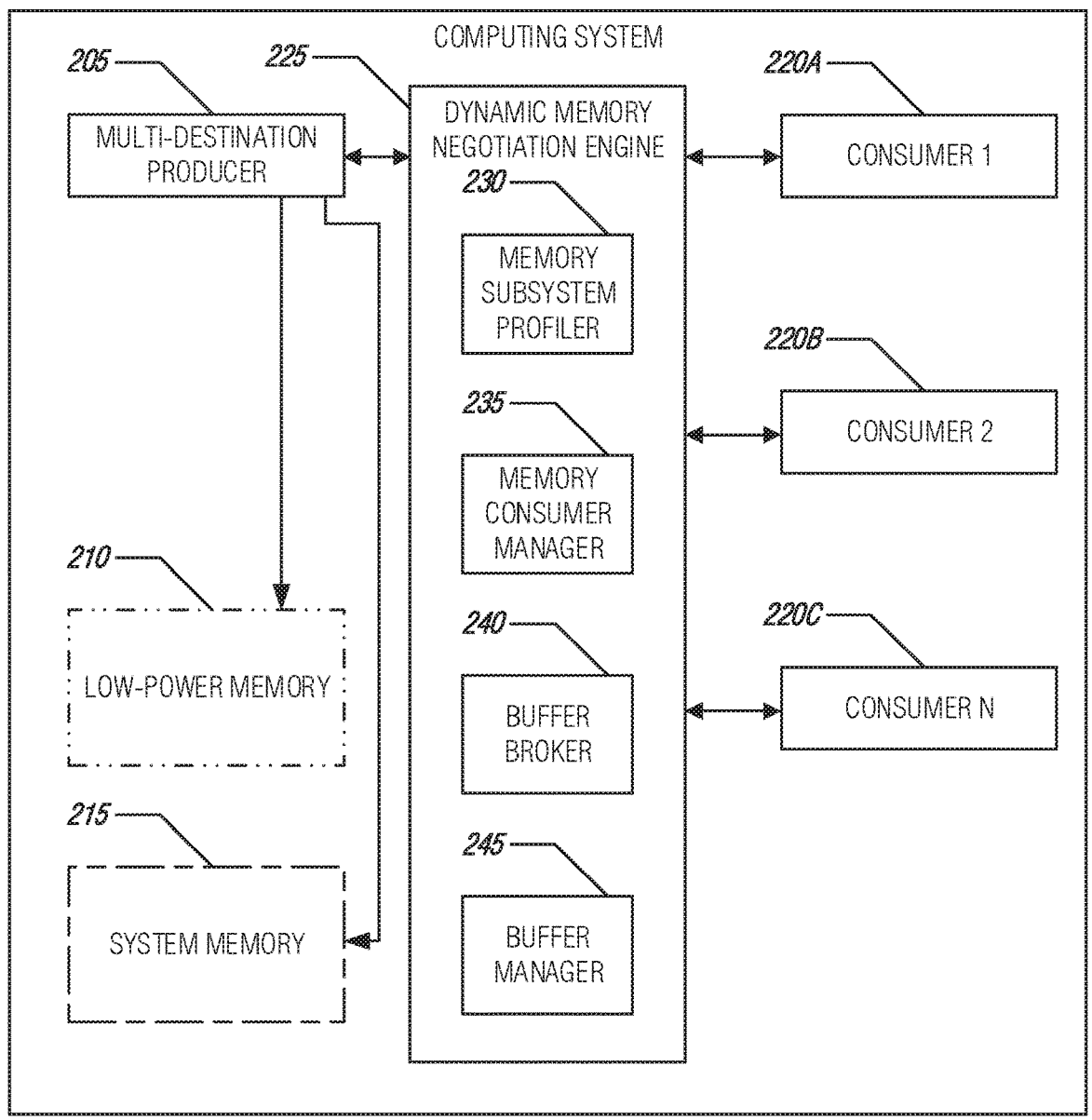
FIG. 2 is a block diagram of an example of a system for bi-directional negotiation for dynamic data chunking, according to an embodiment.

FIG. 2 is a block diagram of an example of a system 200 for bi-directional negotiation for dynamic data chunking, according to an embodiment. The system 200 may be a computing system and may provide features as described in FIG. 1. The system 200 may include a multi-destination producer 205 (e.g., an image sensor, image processor, etc. capable of streaming data to several locations). The multi-destination producer 205 may be communicatively coupled (e.g., via shared bus, etc.) to components of a memory subsystem such as low-power memory 210 (e.g., memory integrated into a system on chip (SoC) architecture, etc.) and system memory 215 (e.g., dynamic random-access memory (DRAM), etc.). The multi-destination producer 205 may provide data output to consumer one 220A, consumer two 220B, through consumer N 220C, collectively, the consumers 220. The consumers 220 may consume data produced by the producer 205.

The system 200 may include a dynamic memory negotiation engine 225 that negotiates memory buffer locations and features between the producer 205 and the consumers 220. The dynamic memory negotiation engine 225 may include a memory subsystem profiler 230, a memory consumer manager 235, a buffer broker 240, and a buffer manager 245. In an example, the dynamic memory negotiation engine 225 may be a logic component of a memory controller device. In another example, a memory controller including the dynamic memory negotiation engine 225 may operate in a flow controller component of the multi-destination memory producer.

The multi-destination producer 205 and the consumers 220 may be communicatively coupled (e.g., via shared bus, etc.) to the dynamic memory negotiation engine 225. The dynamic memory negotiation engine 225 may negotiate memory buffer locations and features between the multi-destination producer 205 and the consumers 220. Once the negotiation is complete, the dynamic memory negotiation engine 225 may transmit and indication of a location and features to be used by the multi-destination producer 205 to create a memory buffer to output a data stream for consumption by one or more of the consumers 220. An indication may be transmitted to the consumers indicating the location and features enabled for the memory buffer generated by the multi-destination producer 205.

The memory subsystem profiler 230 may identify a set of available features for a memory subsystem of the system 200. The set of available features may include latency of buffer locations of the memory subsystem. For example, the memory subsystem profiler 230 may identify that the low-power memory 210 is capable of providing a sub-frame latency memory buffer and the system memory 215 is capable of providing a full-frame latency buffer.

The memory subsystem profiler 230 may identify a variety of capabilities of various memory subsystem components such as, for example, compression features, data chunk size features, packing features, etc. For example, the memory subsystem profiler 230 may identify that the low-power memory 210 and the system memory 215 are each capable of buffer sharing, that the system memory 215 is capable of packing and full-buffer compression. In an example, the memory subsystem profiler 230 may obtain compression features for the buffer locations of the memory subsystem. In another example, the memory subsystem profiler 230 may obtain data chunk size features for the buffer locations of the memory subsystem. The memory subsystem profile 230 may maintain a record of available capabilities of the memory subsystem components to be used in negotiating an appropriate location for a memory buffer negotiated between the multi-destination producer 205 and each of the consumers 220.

The memory consumer manager 235 may obtain an indication of a first latency requirement of a first data consumer such as consumer one 220A and a second latency requirement of a second data consumer such as consumer two 220B. The consumers 220 may each have independent latency requirements and the memory consumer manager 235 may maintain a record of the requirements of each of the consumers. For example, consumer one 220A may have a sub-frame latency requirement while consumer two 220B may have a full-frame latency requirement. In another example, consumer one 220A and consumer two 220B may both have a sub-frame latency requirement or a full-frame latency requirement.

In an example, the consumers 220 may include a time-sharing or multiplexing consumer. In an example, consumer one 220A may be a first channel of a multiplex data consumer and consumer two 220B may be a second channel of the multiplex data consumer. In another example, consumer one 220A may be a first time of a time-sharing data consumer and consumer two 220B may be a second time of the time-sharing data consumer. Requirements for each channel or time of a consumer may be obtained by the memory consumer manager 235 so that an appropriate buffer may be negotiated for each channel or time of the consumer 220.

The memory consumer manager 235 may obtain additional requirements for the consumers 220 such as, for example, compression requirements, data chunk size requirements, etc. In an example, the memory consumer manager 235 may identify a first compression requirement for the first data consumer (e.g., consumer one 220A) and a second compression requirement for the second data consumer (e.g., consumer two 220B). In another example, the memory consumer manager 235 may identify a first data chunk size requirement for the first data consumer (e.g., consumer one 220A) and a second data chunk size requirement for the second data consumer (e.g., consumer two 220B). In an example, the memory consumer manager 235 may identify feature requirements of the consumers 220 based on messages transmitted between the consumers 220 and the memory consumer manager 235. In another example, the memory consumer manager 235 may identify the requirements of the consumers 220 by monitoring interaction between the consumers 220 and components of the memory subsystem. For example, the memory consumer manager 235 may identify that a consumer 220 was unable to read from a compressed buffer and may determine that the consumer 220 requires uncompressed buffer access.

The buffer broker 240 may negotiate a first buffer location of the memory subsystem for a data stream based on the first latency requirement with the first data consumer (e.g., consumer one 220A). In an example, the first buffer location may be a full-frame latency buffer of a system-level memory device (e.g., system memory 215, etc.). In an example, the first buffer location may be a sub-frame latency buffer of a low-power memory device (e.g., low-power memory 210, etc.). In an example, the low-power memory device and the memory controller may be components of an integrated circuit or a system on chip (SoC). The buffer broker 240 may negotiate a second buffer location of the memory subsystem for the data stream based on the second latency requirement with the second data consumer (e.g., consumer two 220B). For example, the first buffer location may be determined to be in the low-power memory 210 based on the low-power memory 210 supporting a sub-frame latency requirement of consumer one 220A and the second buffer location may be determined to be in the system memory 215 supporting a full-frame latency requirement of consumer two 220B.

The negotiation by the buffer broker 240 may include analyzing capabilities of the multi-destination producer 205. For example, consumer one 220A may request a compressed buffer, but the multi-destination producer 205 may not support output to a compressed data buffer. As a result, an uncompressed buffer location may be negotiated by the buffer broker 240. In an example, it may be determined that the second latency requirement is compatible with the first buffer location and the second buffer location may be the same as the first buffer location. Thus, consumers 220 with similar requirements may share a buffer location.

It should be noted that a requirement of a consumer may include a lack of a specific requirement. For example, consumer one 220A may not have a specific latency requirement so the latency requirement for consumer one 220A may be null or may be substituted by a default requirement. The buffer broker 240 may replace, ignore, or otherwise account for missing values when negotiating a buffer location for a consumer. For example, consumer one 220A may have no specific latency requirement and its buffer may be placed in system memory 215 to preserve available space in the low-power memory 210 that may be able to provide sub-frame latency.

In another example, it may be determined that the second latency requirement is incompatible (e.g., a consumer is unable to consume data at the latency level offered by a given buffer location based on a latency requirement provided by the consumer, etc.) with the first buffer location and the first buffer location and the second buffer location may be different. In an example, the first buffer location may be a sub-frame latency buffer of a low-power memory device (e.g., low-power memory 210, etc.) and the second buffer location may be a full-frame latency buffer of a system-level memory device (e.g., system memory 215, etc.). In another example, the first buffer location may be a compressed portion of a full-frame latency buffer of a system-level memory device and the second buffer location may be an uncompressed portion of the full-frame latency buffer.

The buffer broker 240 may analyze a variety of consumer requirements against a variety of capabilities of the multi-destination producer 205 and capabilities of the components of the memory subsystem (e.g., the low-power memory 210, system memory 215, etc.) when negotiating a location and feature set for a buffer for a consumer 220. In an example, the buffer broker 240 may evaluate the first compression requirement of the first data consumer (e.g., consumer one 220A) and the second compression requirement of the second data consumer (e.g., consumer two 220B) when negotiating the first buffer location and the second buffer locations respectively. In another example, the buffer broker 240 may evaluate the first data chunk size requirement of the first data consumer (e.g., consumer one 220A) and the second data chunk size requirement of the second data consumer (e.g., consumer two 220B) when negotiating the first buffer location and the second buffer locations respectively.

In an example, the buffer broker 245 may negotiate buffer locations for groups of consumers 220. In an example, the first data consumer (e.g., consumer one 220A) may be a member of a first data consumer group and the second data consumer (e.g., consumer two 220B) may be a member of a second data consumer group. A first group latency requirement for the first data consumer group and a second group latency requirement for the second data consumer group may be determined and negotiation of the first buffer location and the second buffer location may include evaluation of the first group latency requirement and the second group latency requirement respectively. For example, consumer one 220A may have similar requirements to other consumers 220 and the buffer broker 240 may determine a maximum latency requirement for the group and determine a shared buffer location based on the maximum latency requirement.

The buffer manager 245 may provide an indication of the first buffer location to the first data consumer (e.g., consumer one 220A) and may provide an indication of the second buffer location to the second data consumer (e.g., consumer two 220B). The buffer manager 245 provides consumers 220 with an indication (e.g., pointer, address, etc.) of the location of the negotiated buffer. The buffer manager 245 may also provide an indication to the multi-destination producer 205 where the data stream should be output and what features are enabled for the buffer location. In an example, the multi-destination producer 205 may receive an indication to output the data stream to the first buffer location using a first data chunk size. In another example, the multi-destination producer 205 may receive an indication to output the data stream to the first buffer location using a first data chunk size and to the second buffer location using a second data chunk size. Thus, the multi-destination producer 105 may be provided with a data stream output location optimized for each of the consumers 220. Therefore, the data stream output may be optimized across consumers 220 including separately optimized buffer locations for channels of multiplexing consumers and for time periods of time-sharing consumers 220.

The components of the dynamic negotiation engine 225 may continuously (or periodically) monitor the consumers 220 and the multi-destination producer 205 to dynamically renegotiate buffer locations as requirements of the consumers 220 change and as consumers 220 come online and go offline. Thus, the optimization of the memory subsystem bandwidth is allowed to change to meet continuously changing demands.

Figure 3:
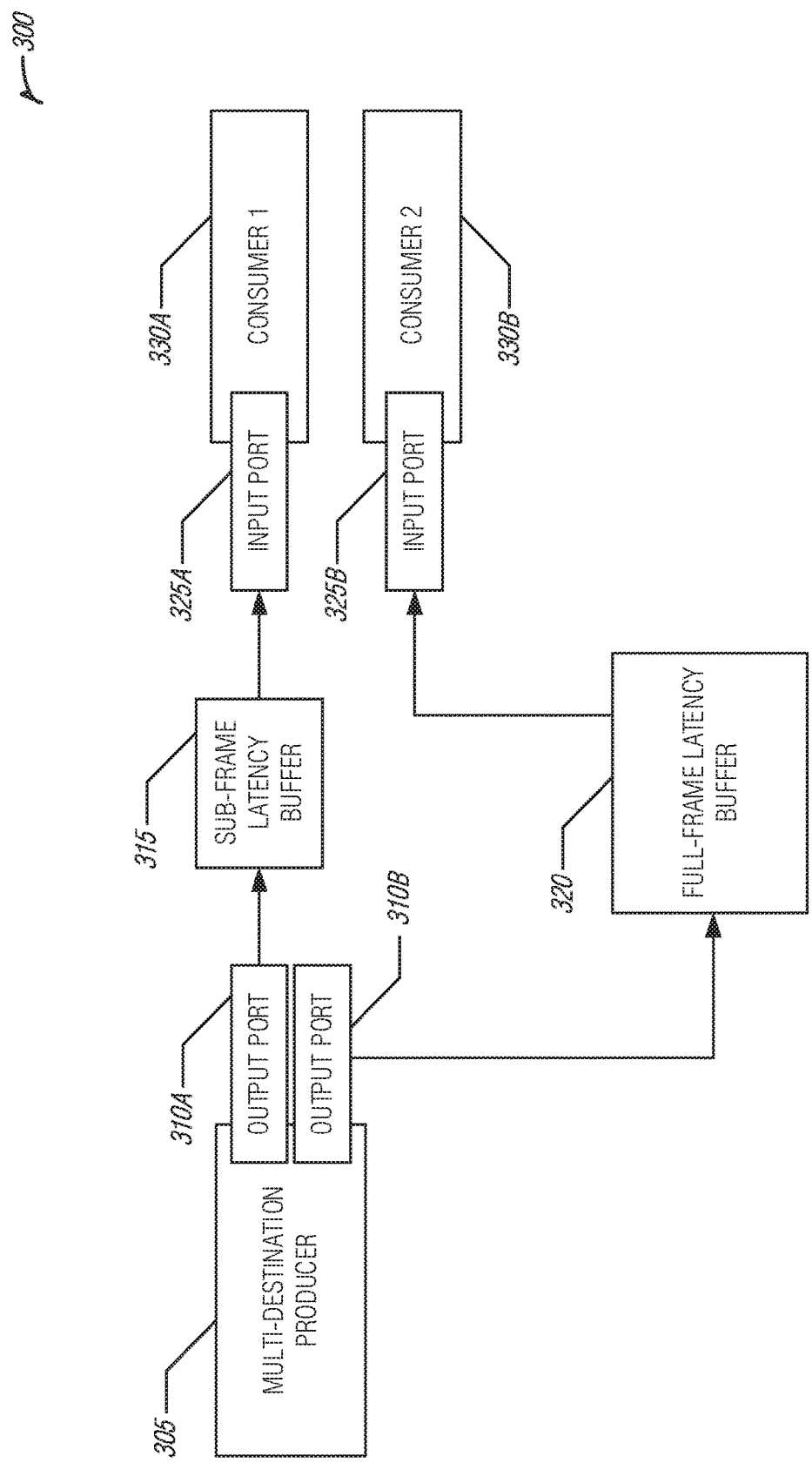
FIG. 3 illustrates an example of a memory buffer configuration based on a negotiation of a sub-frame latency buffer in a low-power memory candidate and a full-frame latency buffer in a system memory candidate and full-buffer compression candidate using bi-directional negotiation for dynamic data chunking, according to an embodiment.

FIG. 3 illustrates an example of a memory buffer configuration 300 based on a negotiation of a sub-frame latency buffer in a low-power memory candidate and a full-frame latency buffer in a system memory candidate and full-buffer compression candidate using bi-directional negotiation for dynamic data chunking, according to an embodiment. The buffer configuration 300 is an example of the result of negotiation (e.g., by the dynamic memory negotiation engine 225 described in FIG. 2) of buffers between a data producer and data consumers.

The buffer configuration 300 may include a multi-destination producer 305 (e.g., multi-destination producer 205 as described in FIG. 2, etc.) having output port 310A and output port 310B. Output port 310A may be communicatively coupled to a sub-frame latency buffer 315 (e.g., in low-power memory 210 as described in FIG. 2, etc.) and output port 310B may be communicatively coupled to full-frame latency buffer 320 (e.g., in system memory 215 as described in FIG. 2, etc.). The sub-frame latency buffer 315 may be communicatively coupled to an input port 325A of consumer one 330A (e.g., consumer one 220A as described in FIG. 2, etc.). The full-frame latency buffer 320 may be communicatively coupled to an input port 325B of consumer two 330B (e.g., consumer two 2209 as described in FIG. 2, etc.).

Consumer one 330A may have a requirement for sub-frame latency and consumer two 330B may have a requirement for full-frame latency. The sub-frame latency buffer 315 may be negotiated for consumer one 330A to be located in a memory component of a memory subsystem supporting sub-frame latency (e.g., low-power memory 210 as described in FIG. 2). The full-frame latency buffer 320 may be negotiated for consumer two 330B in a memory component of a memory subsystem supporting full-frame latency (e.g., system memory 215 as described in FIG. 2). In an example, the full-frame latency buffer 320 may include full-buffer compression features. The multi-destination producer 305 may be provided with an indication (e.g., by the buffer manager 245 as described in FIG. 2, etc.) to output a data stream to the sub-frame latency buffer 315 and the full-frame latency buffer 320. In an example, the indication may include an indication that full-buffer compression should be enabled. Thus, consumer one 330A and consumer two 330B each are provided with a buffer optimized to their individual requirements.

Figure 4:
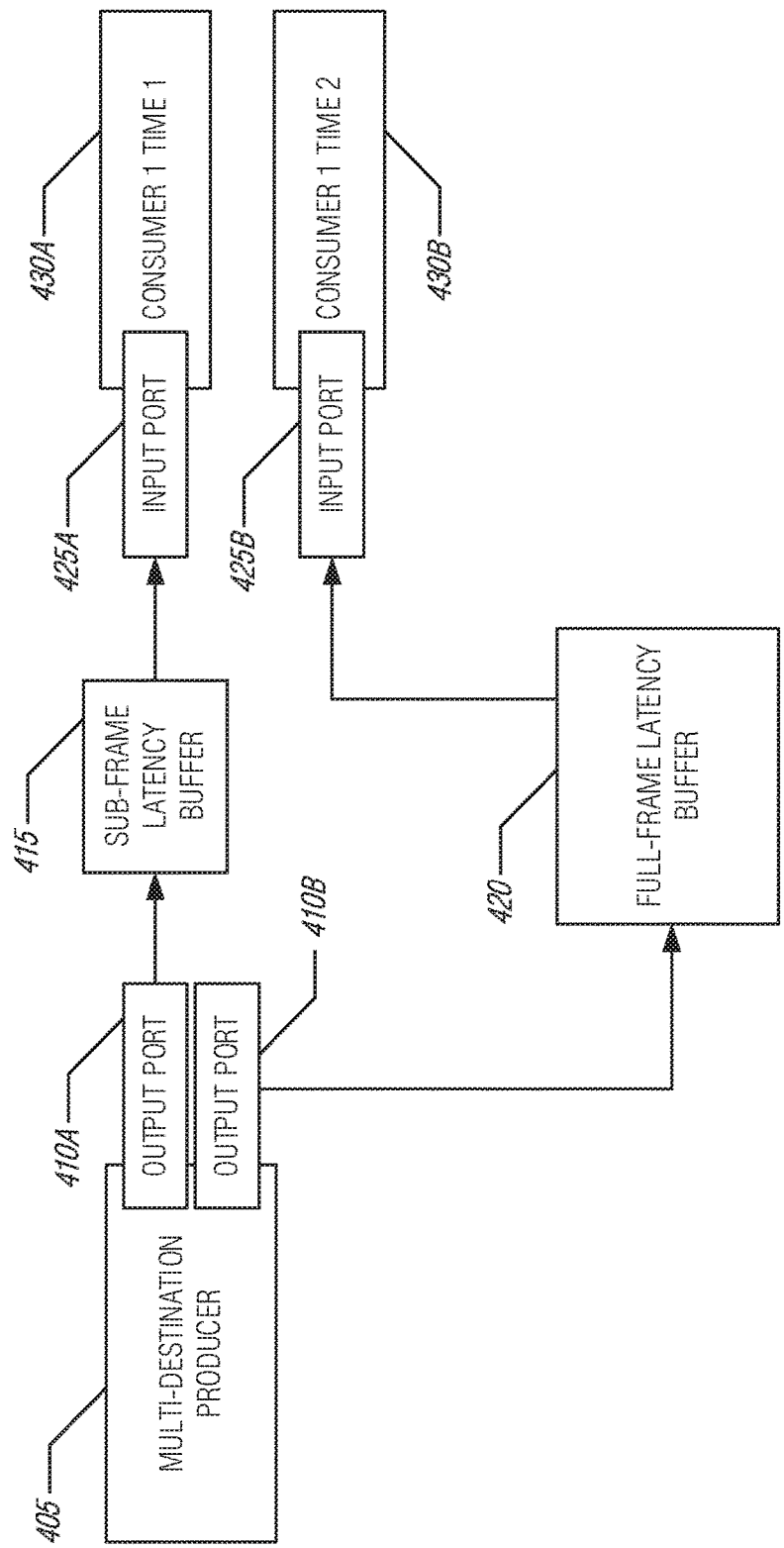
FIG. 4 illustrates an example of a memory buffer configuration based on a negotiation of a sub-frame latency buffer in a low-power memory candidate and a full-frame latency buffer in a system memory candidate and full-buffer compression candidate for a time-sharing memory consumer using bi-directional negotiation for dynamic data chunking, according to an embodiment.

FIG. 4 illustrates an example of a memory buffer configuration 400 based on a negotiation of a sub-frame latency buffer in a low-power memory candidate and a full-frame latency buffer in a system memory candidate and full-buffer compression candidate for a time-sharing memory consumer using bi-directional negotiation for dynamic data chunking, according to an embodiment. The buffer configuration 400 is an example of the result of negotiation (e.g., by the dynamic memory negotiation engine 225 described in FIG. 2) of buffers between a data producer and data consumers. Memory buffer configuration 400 illustrates negotiation of buffer locations for time frames of a time sharing consumer and would be similarly applicable to negotiating memory buffers for channels of a multiplexing consumer.

The buffer configuration 400 may include a multi-destination producer 405 (e.g., multi-destination producer 205 as described in FIG. 2, etc.) having output port 410A and output port 410B. Output port 410A may be communicatively coupled to a sub-frame latency buffer 415 (e.g., in low-power memory 210 as described in FIG. 2, etc.) and output port 410B may be communicatively coupled to full-frame latency buffer 420 (e.g., in system memory 215 as described in FIG. 2, etc.). The sub-frame latency buffer 415 may be communicatively coupled to an input port 425A of consumer one time one 430A (e.g., a first time period of consumer one 220A as described in FIG. 2, etc.). The full-frame latency buffer 420 may be communicatively coupled to an input port 425B of consumer one time two 430B (e.g., a second time period of consumer one 220A as described in FIG. 2, etc.).

Consumer one time one 430A may have a requirement for sub-frame latency and consumer one time two 4309 may have a requirement for full-frame latency. The sub-frame latency buffer 415 may be negotiated for consumer one time one 430A to be located in a memory component of a memory subsystem supporting sub-frame latency (e.g., low-power memory 210 as described in FIG. 2). The full-frame latency buffer 420 may be negotiated for consumer one time two 430B in a memory component of a memory subsystem supporting full-frame latency (e.g., system memory 215 as described in FIG. 2). The multi-destination producer 405 may be provided with an indication (e.g., by the buffer manager 245 as described in FIG. 2, etc.) to output a data stream to the sub-frame latency buffer 415 and the full-frame latency buffer 420. Thus, consumer one time one 430A and consumer one time two 430B each are provided with a buffer optimized to their individual requirements.

Figure 5:
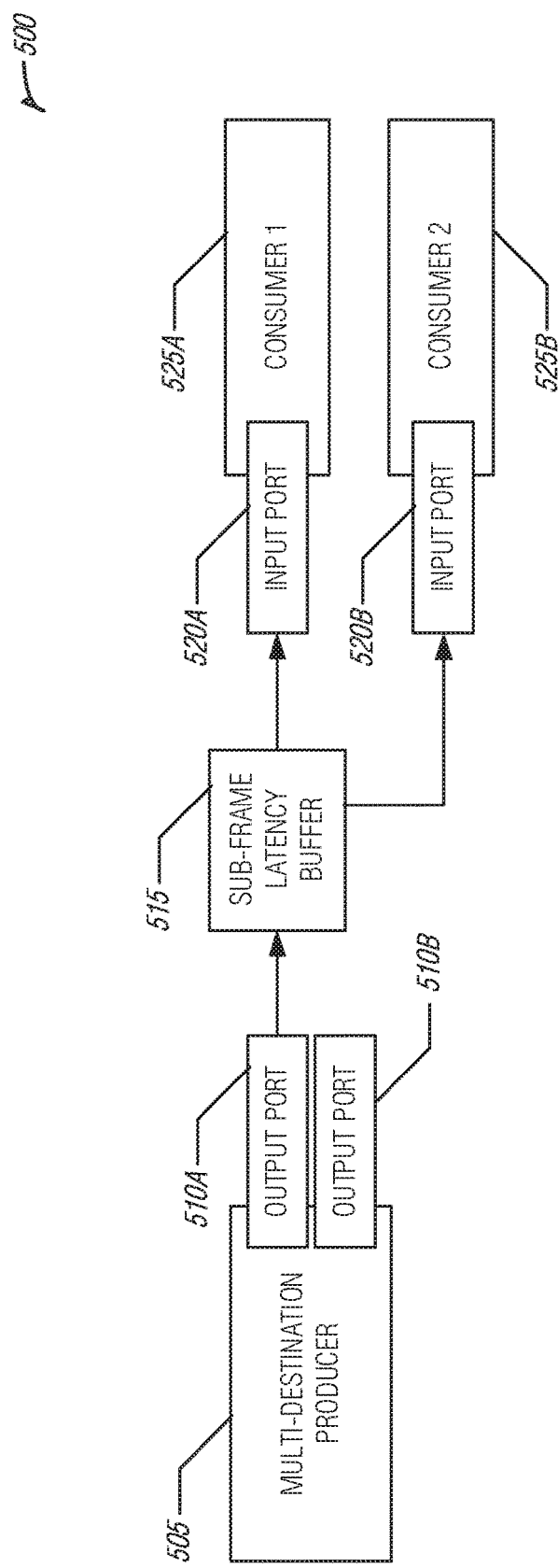
FIG. 5 illustrates an example of a memory buffer configuration based on a negotiation of a shared sub-frame latency buffer in a low-power memory candidate using bi-directional negotiation for dynamic data chunking, according to an embodiment.

FIG. 5 illustrates an example of a memory buffer configuration 500 based on a negotiation of a shared sub-frame latency buffer in a low-power memory candidate using bi-directional negotiation for dynamic data chunking, according to an embodiment. The buffer configuration 500 is an example of the result of negotiation (e.g., by the dynamic memory negotiation engine 225 described in FIG. 2) of buffers between a data producer and data consumers.

The buffer configuration 500 may include a multi-destination producer 505 (e.g., multi-destination producer 205 as described in FIG. 2, etc.) having output port 510A and output port 510B. Output port 510A may be communicatively coupled to a sub-frame latency buffer 515 (e.g., in low-power memory 210 as described in FIG. 2, etc.) and output port 510B may be idle. The sub-frame latency buffer 515 may be communicatively coupled to an input port 520A of consumer one 525A (e.g., consumer one 220A as described in FIG. 2, etc.) and to an input port 520B of consumer two 525B (e.g., consumer two 220B as described in FIG. 2, etc.).

Consumer one 525A and consumer two 525B may both have a requirement for sub-frame latency. The sub-frame latency buffer 515 may be negotiated for consumer one 525A and consumer 525B to be located in a memory component of a memory subsystem supporting sub-frame latency (e.g., low-power memory 210 as described in FIG. 2). The multi-destination producer 505 may be provided with an indication (e.g., by the buffer manager 245 as described in FIG. 2, etc.) to output a data stream to the sub-frame latency buffer 515. Thus, consumer one 525A and consumer two 525B may share a buffer optimized to their similar requirements.

Figure 6:
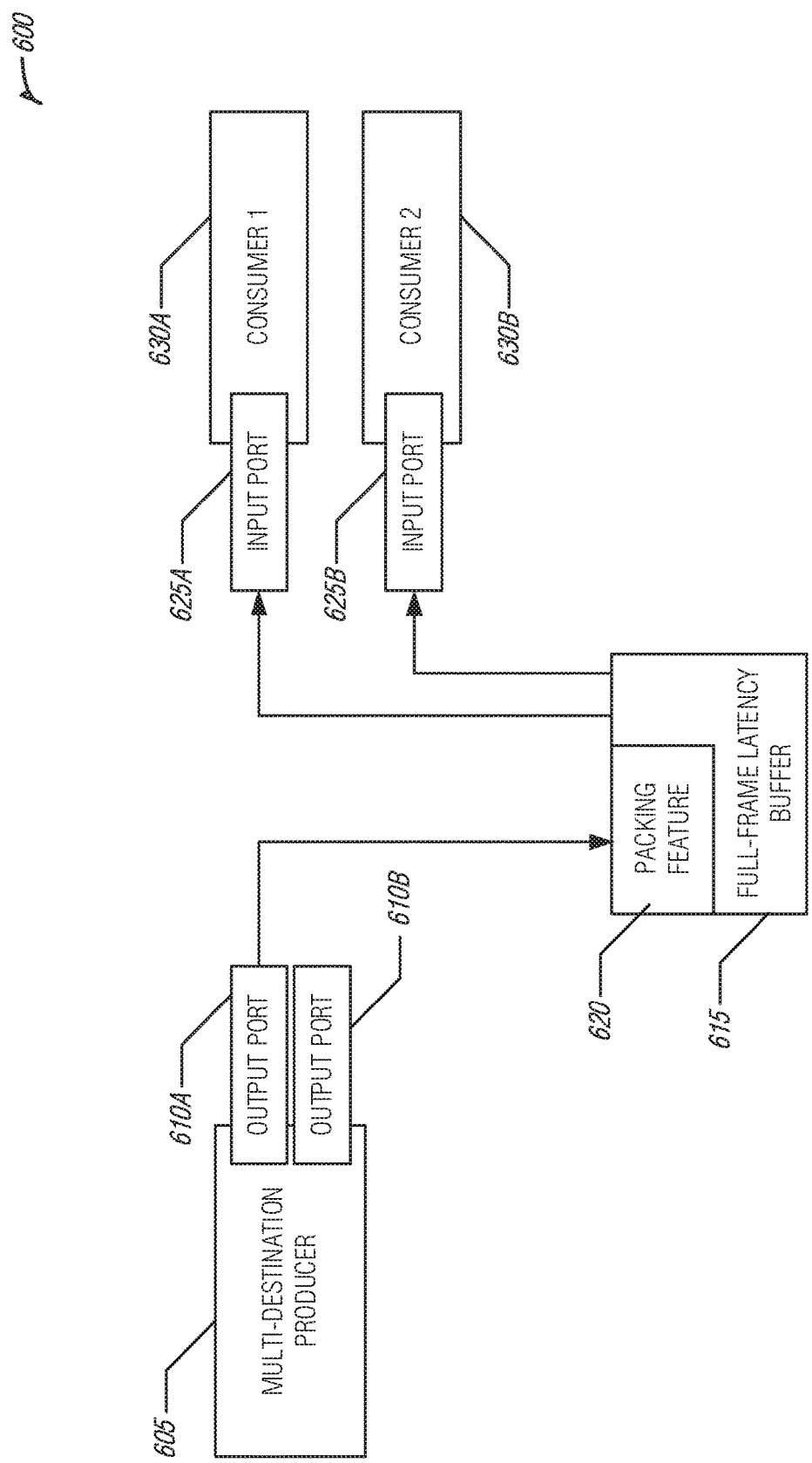
FIG. 6 illustrates an example of a memory buffer configuration based on a negotiation of a shared full-frame latency buffer in a system memory candidate and packing candidate using bi-directional negotiation for dynamic data chunking, according to an embodiment.

FIG. 6 illustrates an example of a memory buffer configuration 600 based on a negotiation of a shared full-frame latency buffer in a system memory candidate and packing candidate using bi-directional negotiation for dynamic data chunking, according to an embodiment. The buffer configuration 600 is an example of the result of negotiation (e.g., by the dynamic memory negotiation engine 225 described in FIG. 2) of buffers between a data producer and data consumers.

The buffer configuration 600 may include a multi-destination producer 605 (e.g., multi-destination producer 205 as described in FIG. 2, etc.) having output port 610A and output port 610B. Output port 610A may be communicatively coupled to a packing feature 620 (e.g., providing data alignment, etc.) of a full-frame latency buffer 615 (e.g., in low-power memory 210 as described in FIG. 2, etc.) and output port 610B may be idle. The full-frame latency buffer 615 may be communicatively coupled to an input port 625A of consumer one 630A (e.g., consumer one 220A as described in FIG. 2, etc.) and to an input port 625B of consumer two 630B (e.g., consumer two 220B as described in FIG. 2, etc.).

Consumer one 630A and consumer two 630B may both have a requirement for packed data at full-frame latency. The full-frame latency buffer 615 may be negotiated for consumer one 630A and consumer 630B to be located in a memory component of a memory subsystem supporting full-frame latency (e.g., system memory 215 as described in FIG. 2). The multi-destination producer 605 may be provided with an indication (e.g., by the buffer manager 245 as described in FIG. 2, etc.) to output a data stream to the packing feature 620 of the full-frame latency buffer 615. Thus, consumer one 630A and consumer two 630B may share a buffer including packed data optimized to their similar requirements.

Figure 7:
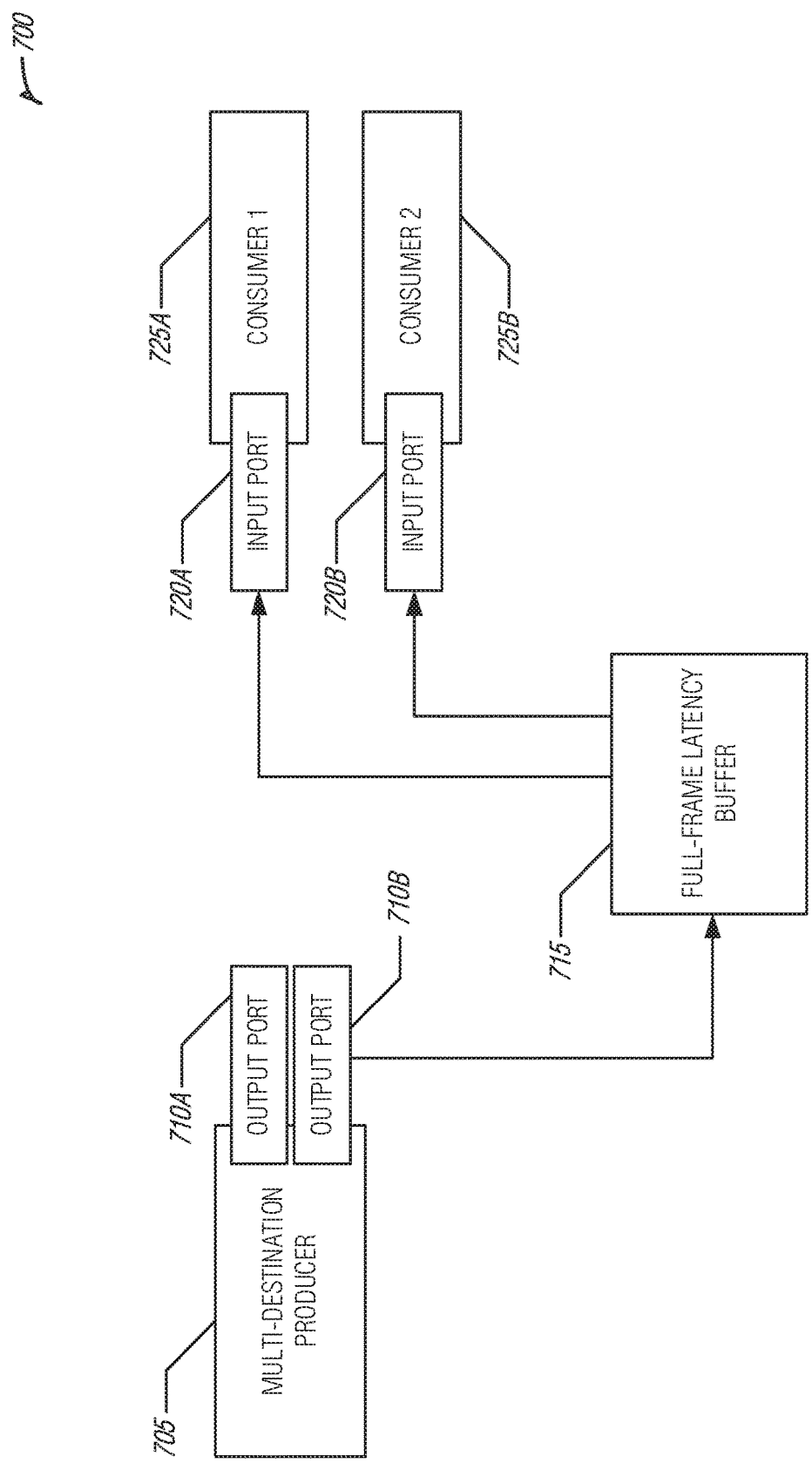
FIG. 7 illustrates an example of a memory buffer configuration based on a negotiation of a shared full-frame latency buffer in a system memory candidate and full-buffer compression candidate using bi-directional negotiation for dynamic data chunking.

FIG. 7 illustrates an example of a memory buffer configuration 700 based on a negotiation of a shared full-frame latency buffer in a system memory candidate and full-buffer compression candidate using bi-directional negotiation for dynamic data chunking, according to an embodiment. The buffer configuration 700 is an example of the result of negotiation (e.g., by the dynamic memory negotiation engine 225 described in FIG. 2) of buffers between a data producer and data consumers.

The buffer configuration 700 may include a multi-destination producer 705 (e.g., multi-destination producer 205 as described in FIG. 2, etc.) having output port 710A and output port 710B. Output port 710A may be idle and output port 710B may be communicatively coupled to full-frame latency buffer 715 (e.g., in system memory 215 as described in FIG. 2, etc.). The full-frame latency buffer 715 may be communicatively coupled to an input port 720A of consumer one 725A (e.g., consumer one 220A as described in FIG. 2, etc.) and to an input port 720B of consumer two 725B (e.g., consumer two 220B as described in FIG. 2, etc.).

Consumer one 725A and consumer two 725B may both have a requirement for full-frame latency. The full-frame latency buffer 715 may be negotiated for consumer one 725A and consumer two 725B to be located in a memory component of a memory subsystem supporting full-frame latency (e.g., system memory 215 as described in FIG. 2). The multi-destination producer 705 may be provided with an indication (e.g., by the buffer manager 245 as described in FIG. 2, etc.) to output a data stream to the full-frame latency buffer 715. Thus, consumer one 725A and consumer two 725B may share a buffer optimized to their similar requirements.

Figure 8:
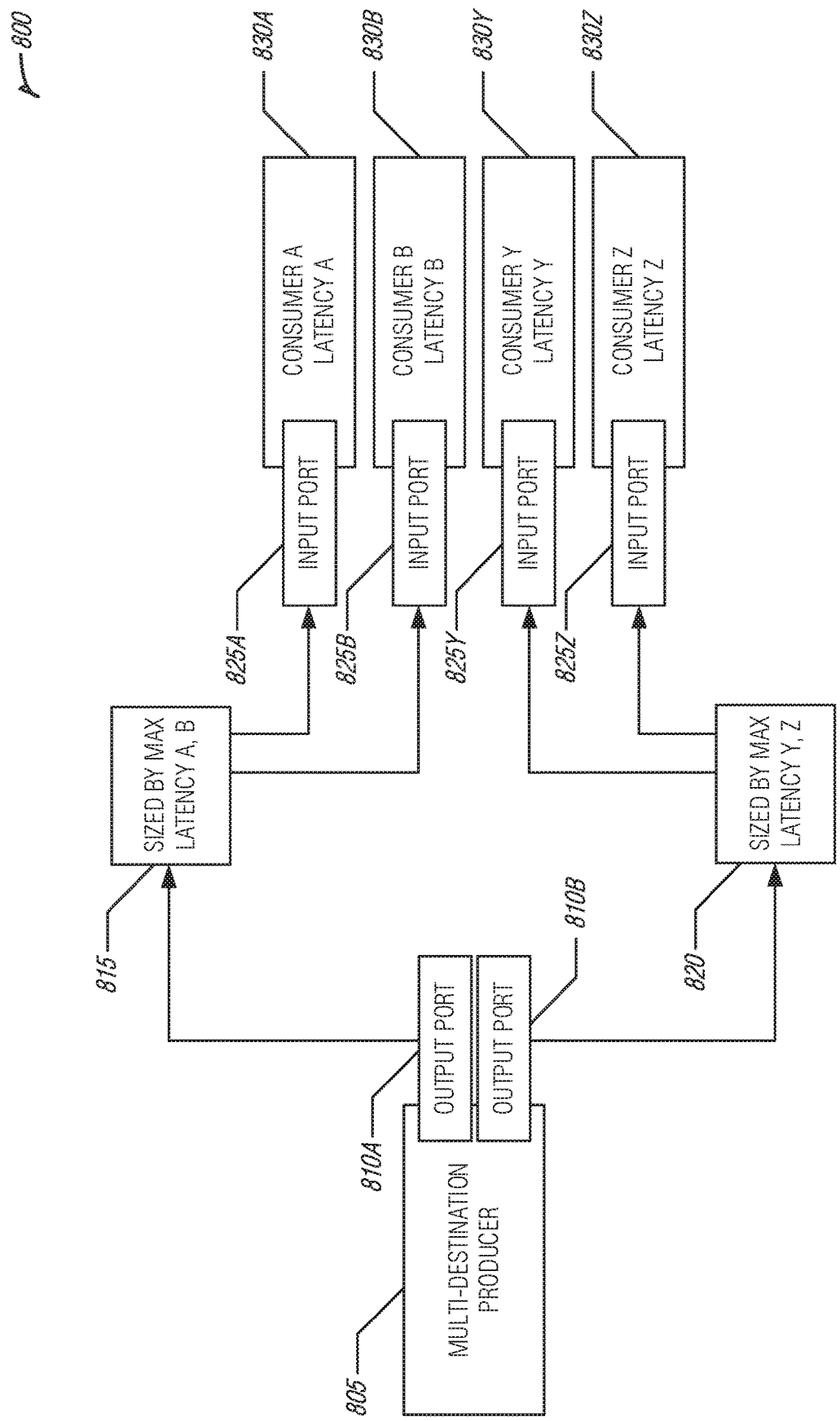
FIG. 8 illustrates an example of a memory buffer configuration based on a negotiation of a buffer sized for maximum latency in a low-latency and low-power memory candidate and a buffer sized for maximum latency in a system memory candidate with optional full-buffer compression and packing using bi-directional negotiation for dynamic data chunking, according to an embodiment.

FIG. 8 illustrates an example of a memory buffer configuration 800 based on a negotiation of a buffer sized for maximum latency in a low-latency and low-power memory candidate and a buffer sized for maximum latency in a system memory candidate with optional full-buffer compression and packing using bi-directional negotiation for dynamic data chunking, according to an embodiment. The buffer configuration 800 is an example of the result of negotiation (e.g., by the dynamic memory negotiation engine 225 described in FIG. 2) of buffers between a data producer and data consumers.

The buffer configuration 800 may include a multi-destination producer 805 (e.g., multi-destination producer 205 as described in FIG. 2, etc.) having output port 810A and output port 810B. Output port 810A may be communicatively coupled to a first consumer group max latency buffer 815 (e.g., in low-power memory 210 as described in FIG. 2, system memory 215 as described in FIG. 2, etc.) and output port 810B may be communicatively coupled to second consumer group max latency buffer 820 (e.g., in low-power memory 210 as described in FIG. 2, system memory 215 as described in FIG. 2, etc.). The first consumer group max latency buffer 815 may be communicatively coupled to an input port 825A of consumer A 830A (e.g., consumer one 220A as described in FIG. 2, etc.) and to an input port 825B of consumer B 830B. The second consumer group max latency buffer 820 may be communicatively coupled to an input port 825Y of consumer Y 8301 (e.g., consumer two 220B as described in FIG. 2, etc.) and to an input port Z 825Z of consumer Z 830Z.

Consumer A 830A may have a latency requirement similar to consumer B 830B or may have other similarities such as feature requirements that cause consumer A 830A and consumer B 830B to negotiate a buffer as a group (e.g., by the buffer broker 240 as described in FIG. 2, etc.). Similarly, consumer Y 830Y may have a latency requirement similar to consumer Z 830Z or may have other similarities such as feature requirements that cause consumer Y 8301 and consumer Z 830Z to negotiate a buffer as a group (e.g., by the buffer broker 240 as described in FIG. 2, etc.). The first consumer group max latency buffer 815 may be negotiated for consumer A 830A and consumer B 830B to be located in a memory component of a memory subsystem supporting a max latency requirement for the group of consumer A 830A and consumer B 830B (e.g., low-power memory 210 as described in FIG. 2, system memory 215 as described in FIG. 2, etc.). The second consumer group max latency buffer 820 may be negotiated for consumer Y 8301 and consumer Z 830Z to be located in a memory component of a memory subsystem supporting a max latency requirement for the group of consumer Y 830Y and consumer Z 830Z (e.g., low-power memory 210 as described in FIG. 2, system memory 215 as described in FIG. 2, etc.). The multi-destination producer 805 may be provided with an indication (e.g., by the buffer manager 285 as described in FIG. 2, etc.) to output a data stream to first consumer group max latency buffer 815 and the second consumer group max latency buffer 820. Thus, consumer A 830A and consumer B 830B may share a buffer optimized to their similar requirements and consumer Y 830Y and consumer Z 830Z may share a buffer optimized to their similar requirements.

Figure 9:
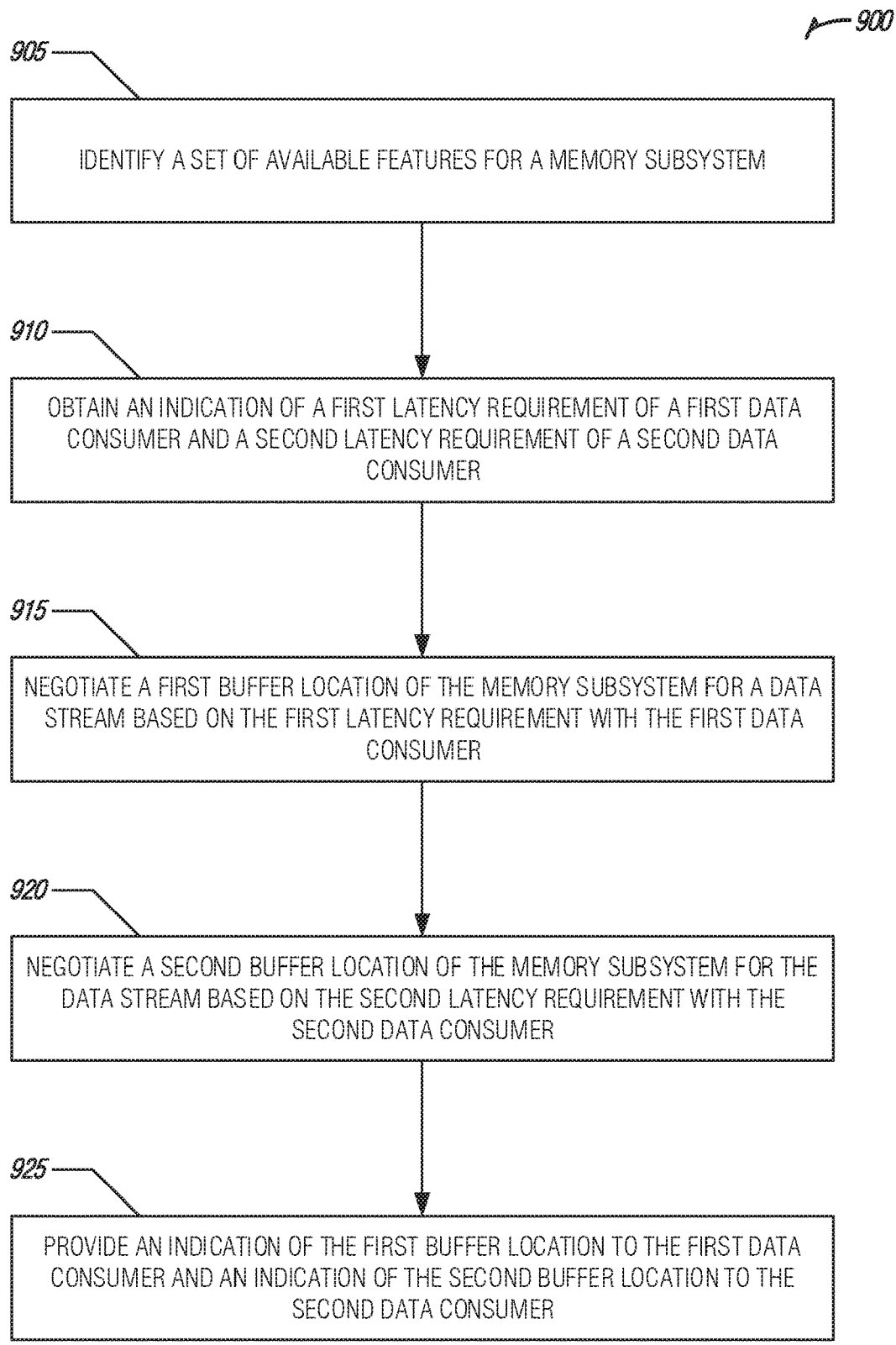
FIG. 9 illustrates an example of a method for bi-directional negotiation for dynamic data chunking, according to an embodiment.

FIG. 9 illustrates an example of a method 900 for bi-directional negotiation for dynamic data chunking, according to an embodiment. The method 900 may provide features as described in FIGS. 1 to 8. In an example, the method 900 may be included in logic of a memory controller. In an example, the memory controller may be a component of an integrated circuit or system on chip (SoC). In an example, the memory controller may operate in a flow controller component of a multi-destination memory producer (e.g., multi-destination producer 205 as described in FIG. 2).

A set of available features may be identified (e.g., by memory subsystem profiler 230 as described in FIG. 2) for a memory subsystem (e.g., at operation 905). The set of available features including latency of buffer locations of the memory subsystem (e.g., low-power memory 210 and system memory 215 as described in FIG. 2, etc.).

Indications may be obtained (e.g., by the memory consumer manager 235 as described in FIG. 2) of a first latency requirement of a first data consumer and a second latency requirement of a second data consumer (e.g., at operation 910). In an example, the first data consumer may be a first channel of a multiplex data consumer and the second data consumer may be a second channel of the multiplex data consumer. In another example, the first data consumer may be a first time frame of a time-sharing data consumer and the second data consumer may be a second time frame of the time-sharing data consumer.

A first buffer location of the memory subsystem for a data stream based on the first latency requirement may be negotiated (e.g., by the buffer broker 240 as described in FIG. 2) with the first data consumer (e.g., at operation 915). In an example, the first buffer location may be a full-frame latency buffer of a system-level memory device. In another example, the first buffer location may be a sub-frame latency buffer of a low-power memory device. In an example, the low-power memory device may be a component of an integrated circuit or a SoC.

A second buffer location of the memory subsystem for the data stream based on the second latency requirement may be negotiated (e.g., by the buffer broker 240 as described in FIG. 2) with the second data consumer (e.g., at operation 920).

An indication of the first buffer location may be provided (e.g., by the buffer manager 245 as described in FIG. 2) to the first data consumer and an indication of the second buffer location may be provided (e.g., by the buffer manager 245 as described in FIG. 2) to the second data consumer (e.g., at operation 925).

In an example, it may be determined (e.g., by the buffer broker 240 as described in FIG. 2) that the second latency requirement is compatible with the first buffer location and the second buffer location may be the same as the first buffer location. The data stream may be output (e.g., by the multi-destination producer 205 as described in FIG. 2) to the first buffer location. In an example, the first buffer location may use a first data chunk size.

In an example, the second latency requirement may be determined (e.g., by the buffer broker 240 as described in FIG. 2) to be incompatible with the first buffer location and the data stream may be output (e.g., by the multi-destination producer 205 as described in FIG. 2) to the first buffer location with a first data chunk size and to the second buffer location with a second data chunk size. In an example, the first buffer location may be a sub-frame latency buffer of a low-power memory device (e.g., low-power memory 210 as described in FIG. 2) and the second buffer location may be a full-frame latency buffer of a system-level memory device (e.g., system memory 215 as described in FIG. 2). In another example, the first buffer location may be a compressed portion of a full-frame latency buffer of a system-level memory device and the second buffer location may be an uncompressed portion of the full-frame latency buffer.

In an example, compression features for the buffer locations of the memory subsystem may be obtained (e.g., by the memory subsystem profiler 230 as described in FIG. 2) and a first compression requirement for the first data consumer and a second compression requirement for the second data consumer may be identified (e.g., by the memory consumer manager 235 as described in FIG. 2). The negotiation (e.g., by the buffer broker 240 as described in FIG. 2) of the first buffer location and the second buffer location may include evaluation of the first compression requirement and the second compression requirement respectively.

In another example, data chunk size features for the buffer locations of the memory subsystem may be obtained (e.g., by the memory subsystem profiler 230 as described in FIG. 2) and a first data chunk size requirement for the first data consumer and a second data chunk size requirement for the second data consumer may be identified (e.g., by the memory consumer manager 235 as described in FIG. 2). The negotiation (e.g., by the buffer broker 240 as described in FIG. 2) of the first buffer location and the second buffer location may include evaluation of the first data chunk size requirement and the second data chunk size requirement respectively.

In an example, the first data consumer may be a member of a first data consumer group and the second data consumer may be a member of a second data consumer group. A first group latency requirement for the first data consumer group and a second group latency requirement for the second data consumer group may be determined (e.g., by the memory consumer manager 235 and the buffer broker 240 as described in FIG. 2). Negotiation (e.g., by the buffer broker 240 as described in FIG. 2) of the first buffer location and the second buffer location may include evaluation of the first group latency requirement and the second group latency requirement respectively.

Figure 10:
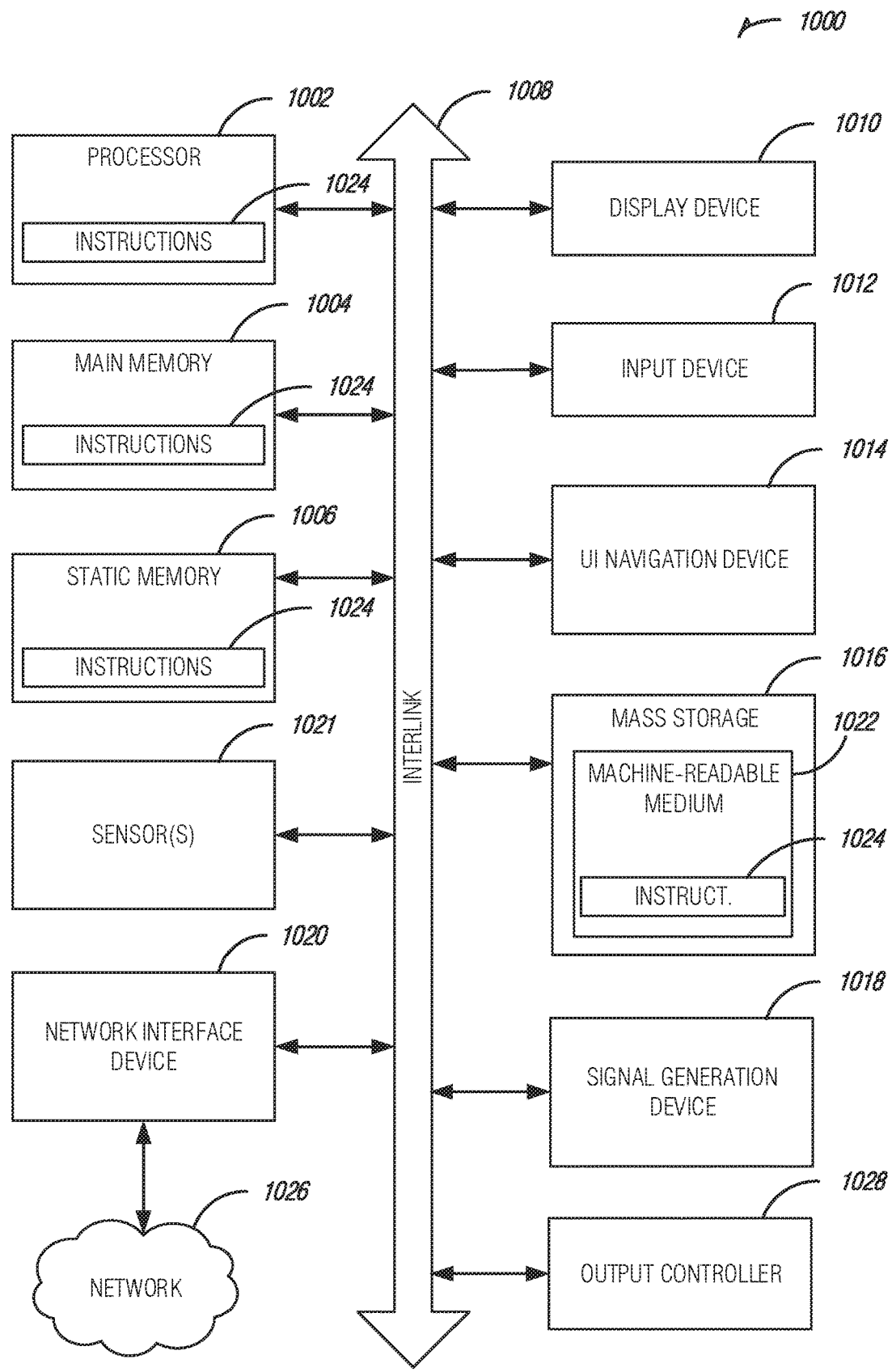
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saab), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "readable medium" may include a single medium or multiple media (e.g., a centralized or distributed database, and/or associated caches and servers) configured to store the one or more instructions 1024.

The term"machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes & Examples

Example 1 is a method for bi-directional negotiation for dynamic data chunking for a memory controller, the method comprising: identifying a set of available features for a memory subsystem, the set of available features including latency of buffer locations of the memory subsystem; obtaining an indication of a first latency requirement of a first data consumer and a second latency requirement of a second data consumer; negotiating a first buffer location of the memory subsystem for a data stream based on the first latency requirement with the first data consumer; negotiating a second buffer location of the memory subsystem for the data stream based on the second latency requirement with the second data consumer; and providing an indication of the first buffer location to the first data consumer and an indication of the second buffer location to the second data consumer.

In Example 2, the subject matter of Example 1 optionally includes determining the second latency requirement is compatible with the first buffer location, wherein the second buffer location is the same as the first buffer location; and output the data stream to the first buffer location, wherein the first buffer location uses a first data chunk size.

In Example 3, the subject matter of any one or more of Examples 1-2 optionally include wherein the first data consumer is a first channel of a multiplex data, consumer and the second data consumer is a second channel of the multiplex data consumer.

In Example 4, the subject matter of any one or more of Examples 1-3 optionally include wherein the first buffer location is a full-frame latency buffer of a system-level memory device.

In Example 5, the subject matter of any one or more of Examples 1-4 optionally include wherein the first buffer location is a sub-frame latency buffer of a low-power memory device.

In Example 6, the subject matter of Example 5 optionally includes wherein the low-power memory device and the memory controller are components of an integrated circuit.

In Example 7, the subject matter of any one or more of Examples 1-6 optionally include determining the second latency requirement is incompatible with the first buffer location; outputting the data stream to the first buffer location, wherein the first buffer location has a first data chunk size; and outputting the data stream to the second buffer location, wherein the second buffer location has a second data chunk size.

In Example 8, the subject matter of Example 7 optionally includes wherein the first buffer location is a sub-frame latency buffer of a low-power memory device and the second buffer location is a full-frame latency buffer of a system-level memory device.

In Example 9, the subject matter of any one or more of Examples 7-8 optionally include wherein the first buffer location is a compressed portion of a full-frame latency buffer of a system-level memory device and the second buffer location is an uncompressed portion of the full-frame latency buffer.

In Example 10, the subject matter of any one or more of Examples 1-9 optionally include obtaining compression features for the buffer locations of the memory subsystem; and identifying a first compression requirement for the first data consumer and a second compression requirement for the second data consumer, wherein negotiating the first buffer location and the second buffer location includes evaluation of the first compression requirement and the second compression requirement respectively.

In Example 11, the subject matter of any one or more of Examples 1-10 optionally include obtaining data chunk size features for the buffer locations of the memory subsystem; and identifying a first data chunk size requirement for the first data consumer and a second data chunk size requirement for the second data consumer, wherein negotiating the first buffer location and the second buffer location includes evaluation of the first data chunk size requirement and the second data chunk size requirement respectively.

In Example 12, the subject matter of any one or more of Examples 1-11 optionally include wherein the first data consumer is a member of a first data consumer group and the second data consumer is a member of a second data consumer group and the method further comprises: determining a first group latency requirement for the first data consumer group and a second group latency requirement for the second data consumer group, wherein negotiating the first buffer location and the second buffer location includes evaluation of the first group latency requirement and the second group latency requirement respectively.

In Example 13, the subject matter of any one or more of Examples 1-12 optionally include wherein the memory controller operates in a flow controller component of a multi-destination memory producer.

Example 14 is a system to implement bi-directional negotiation for dynamic data chunking for a memory controller, the system comprising means to perform any method of Examples 1-13.

Example 15 is at least one machine readable medium to implement bi-directional negotiation for dynamic data chunking for a memory controller, the at least one machine readable medium including instructions that, when executed by a machine, cause the machine to perform any method of Examples 1-13.

Example 16 is a memory control device for bi-directional negotiation for dynamic data chunking, the memory control device comprising: at least one processor; and memory including instructions that, when executed by the at least one processor, cause the at least one processor to: identify a set of available features for a memory subsystem, the set of available features including latency of buffer locations of the memory subsystem; obtain an indication of a first latency requirement of a first data consumer and a second latency requirement of a second data consumer; negotiate a first buffer location of the memory subsystem for a data stream based on the first latency requirement with the first data consumer; negotiate a second buffer location of the memory subsystem for the data stream based on the second latency requirement with the second data consumer; and provide an indication of the first buffer location to the first data consumer and an indication of the second buffer location to the second data consumer.

In Example 17, the subject matter of Example 16 optionally includes instructions to: determine the second latency requirement is compatible with the first buffer location, wherein the second buffer location is the same as the first buffer location; and output the data stream to the first buffer location, wherein the first buffer location uses a first data chunk size.

In Example 18, the subject matter of any one or more of Examples 16-17 optionally include wherein the first data consumer is a first channel of a multiplex data consumer and the second data consumer is a second channel of the multiplex data consumer.

In Example 19, the subject matter of any one or more of Examples 16-18 optionally include wherein the first buffer location is a full-frame latency buffer of a system-level memory device.

In Example 20, the subject matter of any one or more of Examples 16-19 optionally include wherein the first buffer location is a sub-frame latency buffer of a low-power memory device.

In Example 21, the subject matter of Example 20 optionally includes wherein the low-power memory device and the memory controller are components of an integrated circuit.

In Example 22, the subject matter of any one or more of Examples 16-21 optionally include instructions to: determine the second latency requirement is incompatible with the first buffer location; output the data stream to the first buffer location, wherein the first buffer location has a first data chunk size; and output the data stream to the second buffer location, wherein the second buffer location has a second data chunk size.

In Example 23, the subject matter of Example 22 optionally includes wherein the first buffer location is a sub-frame latency buffer of a low-power memory device and the second buffer location is a full-frame latency buffer of a system-level memory device.

In Example 24, the subject matter of any one or more of Examples 22-23 optionally include wherein the first buffer location is a compressed portion of a full-frame latency buffer of a system-level memory device and the second buffer location is an uncompressed portion of the full-frame latency buffer.

In Example 25, the subject matter of any one or more of Examples 16-24 optionally include instructions to: obtain compression features for the buffer locations of the memory subsystem; and identify a first compression requirement for the first data consumer and a second compression requirement for the second data consumer, wherein the instructions to negotiate the first buffer location and the second buffer location includes instructions to evaluate the first compression requirement and the second compression requirement respectively.

In Example 26, the subject matter of any one or more of Examples 16-25 optionally include instructions to: obtain data chunk size features for the buffer locations of the memory subsystem; and identify a first data chunk size requirement for the first data consumer and a second data chunk size requirement for the second data consumer, wherein the instructions to negotiate the first buffer location and the second buffer location includes instructions to evaluate the first data chunk size requirement and the second data chunk size requirement respectively.

In Example 27, the subject matter of any one or more of Examples 16-26 optionally include wherein the first data consumer is a member of a first data consumer group and the second data consumer is a member of a second data consumer group and the instructions further comprises instructions to: determine a first group latency requirement for the first data consumer group and a second group latency requirement for the second data consumer group, wherein the instructions to negotiate the first buffer location and the second buffer location includes instructions to evaluate the first group latency requirement and the second group latency requirement respectively.

In Example 28, the subject matter of any one or more of Examples 16-27 optionally include wherein the memory control device operates in a flow controller component of a multi-destination memory producer.

Example 29 is at least one computer readable medium including instructions for bi-directional negotiation for dynamic data chunking that when executed by at least one processor, cause the at least one processor to: identify a set of available features for a memory subsystem, the set of available features including latency of buffer locations of the memory subsystem; obtain an indication of a first latency requirement of a first data consumer and a second latency requirement of a second data consumer; negotiate a first buffer location of the memory subsystem for a data stream based on the first latency requirement with the first data consumer; negotiate a second buffer location of the memory subsystem for the data stream based on the second latency requirement with the second data consumer; and provide an indication of the first buffer location to the first data consumer and an indication of the second buffer location to the second data consumer.

In Example 30, the subject matter of Example 29 optionally includes instructions to: determine the second latency requirement is compatible with the first buffer location, wherein the second buffer location is the same as the first buffer location; and output the data stream to the first buffer location, wherein the first buffer location uses a first data chunk size.

In Example 31, the subject matter of any one or more of Examples 29-30 optionally include wherein the first data consumer is a first channel of a multiplex data consumer and the second data consumer is a second channel of the multiplex data consumer.

In Example 32, the subject matter of any one or more of Examples 29-31 optionally include wherein the first buffer location is a full-frame latency buffer of a system-level memory device.

In Example 33, the subject matter of any one or more of Examples 29-32 optionally include wherein the first buffer location is a sub-frame latency buffer of a low-power memory device.

In Example 34, the subject matter of Example 33 optionally includes wherein the low-power memory device and the memory controller are components of an integrated circuit.

In Example 35, the subject matter of any one or more of Examples 29-34 optionally include instructions to: determine the second latency requirement is incompatible with the first buffer location; output the data stream to the first buffer location, wherein the first buffer location has a first data chunk size; and output the data stream to the second buffer location, wherein the second buffer location has a second data chunk size.

In Example 36, the subject matter of Example 35 optionally includes wherein the first buffer location is a sub-frame latency buffer of a low-power memory device and the second buffer location is a full-frame latency buffer of a system-level memory device.

In Example 37, the subject matter of any one or more of Examples 35-36 optionally include wherein the first buffer location is a compressed portion of a full-frame latency buffer of a system-level memory device and the second buffer location is an uncompressed portion of the full-frame latency buffer.

In Example 38, the subject matter of any one or more of Examples 29-37 optionally include instructions to: obtain compression features for the buffer locations of the memory subsystem; and identify a first compression requirement for the first data consumer and a second compression requirement for the second data consumer, wherein the instructions to negotiate the first buffer location and the second buffer location includes instructions to evaluate the first compression requirement and the second compression requirement respectively.

In Example 39, the subject matter of any one or more of Examples 29-38 optionally include instructions to: obtain data chunk size features for the buffer locations of the memory subsystem; and identify a first data chunk size requirement for the first data consumer and a second data chunk size requirement for the second data consumer, wherein the instructions to negotiate the first buffer location and the second buffer location includes instructions to evaluate the first data chunk size requirement and the second data chunk size requirement respectively.

In Example 40, the subject matter of any one or more of Examples 29-39 optionally include wherein the first data consumer is a member of a first data consumer group and the second data consumer is a member of a second data consumer group and the instructions further comprises instructions to: determine a first group latency requirement for the first data consumer group and a second group latency requirement for the second data consumer group, wherein the instructions to negotiate the first buffer location and the second buffer location includes instructions to evaluate the first group latency requirement and the second group latency requirement respectively.

In Example 41, the subject matter of any one or more of Examples 29-40 optionally include wherein the instructions operate in a flow controller component of a multi-destination memory producer.

Example 42 is a system for bi-directional negotiation for dynamic data chunking, the system comprising: means for identifying a set of available features for a memory subsystem, the set of available features including latency of buffer locations of the memory subsystem; means for obtaining an indication of a first latency requirement of a first data consumer and a second latency requirement of a second data consumer; means for negotiating a first buffer location of the memory subsystem for a data stream based on the first latency requirement with the first data consumer; means for negotiating a second buffer location of the memory subsystem for the data stream based on the second latency requirement with the second data consumer; and means for providing an indication of the first buffer location to the first data consumer and an indication of the second buffer location to the second data consumer.

In Example 43, the subject matter of Example 42 optionally includes means for determining the second latency requirement is compatible with the first buffer location, wherein the second buffer location is the same as the first buffer location; and means for output the data stream to the first buffer location, wherein the first buffer location uses a first data chunk size.

In Example 44, the subject matter of any one or more of Examples 42-43 optionally include wherein the first data consumer is a first channel of a multiplex data consumer and the second data consumer is a second channel of the multiplex data consumer.

In Example 45, the subject matter of any one or more of Examples 42-44 optionally include wherein the first buffer location is a full-frame latency buffer of a system-level memory device.

In Example 46, the subject matter of any one or more of Examples 42-45 optionally include wherein the first buffer location is a sub-frame latency buffer of a low-power memory device.

In Example 47, the subject matter of Example 46 optionally includes wherein the low-power memory device and the memory controller are components of an integrated circuit.

In Example 48, the subject matter of any one or more of Examples 42-47 optionally include means for determining the second latency requirement is incompatible with the first buffer location; means for outputting the data stream to the first buffer location, wherein the first buffer location has a first data chunk size; and means for outputting the data stream to the second buffer location, wherein the second buffer location has a second data chunk size.

In Example 49, the subject matter of Example 48 optionally includes wherein the first buffer location is a sub-frame latency buffer of a low-power memory device and the second buffer location is a full-frame latency buffer of a system-level memory device.

In Example 50, the subject matter of any one or more of Examples 48-49 optionally include wherein the first buffer location is a compressed portion of a full-frame latency buffer of a system-level memory device and the second buffer location is an uncompressed portion of the full-frame latency buffer.

In Example 51, the subject matter of any one or more of Examples 42-50 optionally include means for obtaining compression features for the buffer locations of the memory subsystem; and means for identifying a first compression requirement for the first data consumer and a second compression requirement for the second data consumer, wherein the means for negotiating the first buffer location and the second buffer location includes means for evaluating the first compression requirement and the second compression requirement respectively.

In Example 52, the subject matter of any one or more of Examples 42-51 optionally include means for obtaining data chunk size features for the buffer locations of the memory subsystem; and means for identifying a first data chunk size requirement for the first data consumer and a second data chunk size requirement for the second data consumer, wherein the means for negotiating the first buffer location and the second buffer location includes means for evaluating the first data chunk size requirement and the second data chunk size requirement respectively.

In Example 53, the subject matter of any one or more of Examples 42-52 optionally include wherein the first data consumer is a member of a first data consumer group and the second data consumer is a member of a second data consumer group and the system further comprises: means for determining a first group latency requirement for the first data consumer group and a second group latency requirement for the second data consumer group, wherein the means for negotiating the first buffer location and the second buffer location includes means for evaluating the first group latency requirement and the second group latency requirement respectively.

In Example 54, the subject matter of any one or more of Examples 42-53 optionally include wherein instructions operate in a flow controller component of a multi-destination memory producer.

Example 55 is at least one machine-readable medium including instructions that, when executed processor circuitry, cause the processor circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A memory control device for dynamic data chunking, the memory control device comprising:
    at least one processor; and
    memory including instructions that, when executed by the at least one processor, cause the at least one processor to:
    identify a set of available features for a memory subsystem, the set of available features including latency of buffer locations of the memory subsystem;
    obtain an indication of a first latency requirement of a first data consumer and a second latency requirement of a second data consumer;
    identify, for the first data consumer, a first buffer location of the memory subsystem for a data stream based on the first latency requirement, wherein identification of the first buffer location includes identifying that the first buffer location is compatible with the first latency requirement;
    identify, for the second data consumer, a second buffer location of the memory subsystem for the data stream based on the second latency requirement wherein identification of the second buffer location includes identifying that the second buffer location is compatible with the second latency requirement; and
    provide an indication of the first buffer location to the first data consumer and an indication of the second buffer location to the second data consumer.

2. The memory control device of claim 1, wherein the instructions to identify the second buffer location include instructions to determine the second latency requirement is compatible with the first buffer location, wherein the second buffer location is the same as the first buffer location and further comprising instructions to output the data stream to the first buffer location, wherein the first buffer location uses a first data chunk size.

3. The memory control device of claim 1, wherein the first data consumer is a first channel of a multiplex data consumer and the second data consumer is a second channel of the multiplex data consumer.

4. The memory control device of claim 1, wherein the instructions to identify the second buffer location include instructions to determine the second latency requirement is incompatible with the first buffer location and further comprising instructions to:
    output the data stream to the first buffer location, wherein the first buffer location has a first data chunk size; and
    output the data stream to the second buffer location, wherein the second buffer location has a second data chunk size.

5. The memory control device of claim 4, wherein the first buffer location is a sub-frame latency buffer of a low-power memory device and the second buffer location is a full-frame latency buffer of a system-level memory device.

6. The memory control device of claim 4, wherein the first buffer location is a compressed portion of a full-frame latency buffer of a system-level memory device and the second buffer location is an uncompressed portion of the full-frame latency buffer.

7. The memory control device of claim 1, further comprising instructions to:
obtain compression features for the buffer locations of the memory subsystem; and
identify a first compression requirement for the first data consumer and a second compression requirement for the second data consumer, wherein the instructions to identify the first buffer location and the second buffer location include instructions to evaluate the first compression requirement and the second compression requirement respectively.

8. The memory control device of claim 1, further comprising instructions to:
obtain data chunk size features for the buffer locations of the memory subsystem; and
identify a first data chunk size requirement for the first data consumer and a second data chunk size requirement for the second data consumer, wherein the instructions to identify the first buffer location and the second buffer location include instructions to evaluate the first data chunk size requirement and the second data chunk size requirement respectively.

9. The memory control device of claim 1, wherein the first data consumer is a member of a first data consumer group and the second data consumer is a member of a second data consumer group and the instructions further comprising instructions to:
determine a first group latency requirement for the first data consumer group and a second group latency requirement for the second data consumer group, wherein the instructions to identify the first buffer location and the second buffer location include instructions to evaluate the first group latency requirement and the second group latency requirement respectively.

10. At least one non-transitory computer readable medium including instructions for dynamic data chunking that when executed by at least one processor, cause the at least one processor to:
identify a set of available features for a memory subsystem, the set of available features including latency of buffer locations of the memory subsystem;
obtain an indication of a first latency requirement of a first data consumer and a second latency requirement of a second data consumer;
identify, for the first data consumer, a first buffer location of the memory subsystem for a data stream based on the first latency requirement, wherein identification of the first buffer location includes identifying that the first buffer location is compatible with the first latency requirement;
identify, for the second data consumer, a second buffer location of the memory subsystem for the data stream based on the second latency requirement, wherein identification of the first buffer location includes identifying that the first buffer location is compatible with the first latency requirement; and
provide an indication of the first buffer location to the first data consumer and an indication of the second buffer location to the second data consumer.

11. The at least one computer readable medium of claim 10, wherein the instructions to identify the second buffer location include instructions to determine the second latency requirement is compatible with the first buffer location, wherein the second buffer location is the same as the first buffer location and further comprising instructions to output the data stream to the first buffer location, wherein the first buffer location uses a first data chunk size.

12. The at least one computer readable medium of claim 10, wherein the first data consumer is a first channel of a multiplex data consumer and the second data consumer is a second channel of the multiplex data consumer.

13. The at least one computer readable medium of claim 10, wherein the instructions to identify the second buffer location include instructions to determine the second latency requirement is incompatible with the first buffer location and further comprising instructions to:
output the data stream to the first buffer location, wherein the first buffer location has a first data chunk size; and
output the data stream to the second buffer location, wherein the second buffer location has a second data chunk size.

14. The at least one computer readable medium of claim 10, further comprising instructions to:
obtain compression features for the buffer locations of the memory subsystem; and
identify a first compression requirement for the first data consumer and a second compression requirement for the second data consumer, wherein the instructions to identify the first buffer location and the second buffer location include instructions to evaluate the first compression requirement and the second compression requirement respectively.

15. The at least one computer readable medium of claim 10, further comprising instructions to:
obtain data chunk size features for the buffer locations of the memory subsystem; and
identify a first data chunk size requirement for the first data consumer and a second data chunk size requirement for the second data consumer, wherein the instructions to identify the first buffer location and the second buffer location include instructions to evaluate the first data chunk size requirement and the second data chunk size requirement respectively.

16. The at least one computer readable medium of claim 10, wherein the first data consumer is a member of a first data consumer group and the second data consumer is a member of a second data consumer group and the instructions further comprising instructions to:
determine a first group latency requirement for the first data consumer group and a second group latency requirement for the second data consumer group, wherein the instructions to identify the first buffer location and the second buffer location include instructions to evaluate the first group latency requirement and the second group latency requirement respectively.

17. A method for dynamic data chunking for a memory controller, the method comprising:
identifying a set of available features for a memory subsystem, the set of available features including latency of buffer locations of the memory subsystem;
obtaining an indication of a first latency requirement of a first data consumer and a second latency requirement of a second data consumer;

identifying, for the first data consumer, a first buffer location of the memory subsystem for a data stream based on the first latency requirement, wherein identification of the first buffer location includes identifying that the first buffer location is compatible with the first latency requirement;

identifying, for the second data consumer, a second buffer location of the memory subsystem for the data stream based on the second latency requirement, wherein identification of the first buffer location includes identifying that the first buffer location is compatible with the first latency requirement; and providing an indication of the first buffer location to the first data consumer and an indication of the second buffer location to the second data consumer.

18. The method of claim 17, wherein identifying the second buffer location includes determining the second latency requirement is compatible with the first buffer location, wherein the second buffer location is the same as the first buffer location and further comprising outputting the data stream to the first buffer location, wherein the first buffer location uses a first data chunk size.

19. The method of claim 17, wherein identifying the second buffer location includes determining the second latency requirement is incompatible with the first buffer location and further comprising:

outputting the data stream to the first buffer location, wherein the first buffer location has a first data chunk size; and outputting the data stream to the second buffer location, wherein the second buffer location has a second data chunk size.

20. The method of claim 19, wherein the first buffer location is a sub-frame latency buffer of a low-power memory device and the second buffer location is a full-frame latency buffer of a system-level memory device.

21. The method of claim 17, further comprising:
obtaining compression features for the buffer locations of the memory subsystem; and
identifying a first compression requirement for the first data consumer and a second compression requirement for the second data consumer, wherein identifying the first buffer location and the second buffer location includes evaluation of the first compression requirement and the second compression requirement respectively.

22. The method of claim 17, further comprising:
obtaining data chunk size features for the buffer locations of the memory subsystem; and
identifying a first data chunk size requirement for the first data consumer and a second data chunk size requirement for the second data consumer, wherein identifying the first buffer location and the second buffer location includes evaluation of the first data chunk size requirement and the second data chunk size requirement respectively.

23. The method of claim 17, wherein the first data consumer is a member of a first data consumer group and the second data consumer is a member of a second data consumer group and the method further comprises:

determining a first group latency requirement for the first data consumer group and a second group latency requirement for the second data consumer group, wherein identifying the first buffer location and the second buffer location includes evaluation of the first group latency requirement and the second group latency requirement respectively.

* * * * *